United States Patent [19]

Ellingson

[11] Patent Number: 4,975,886
[45] Date of Patent: Dec. 4, 1990

[54] DETECTING AND RANGING SYSTEM

[75] Inventor: Herman E. Ellingson, Silver Spring, Md.

[73] Assignee: The United States of America as represented by the Secretary of the Navy, Washington, D.C.

[21] Appl. No.: 31,493

[22] Filed: May 24, 1960

[51] Int. Cl.⁵ .............................................. G01S 3/80
[52] U.S. Cl. ................................................. 367/124
[58] Field of Search ................. 340/3, 6, 16; 35/10.4;
181/26; 324/83, 88; 343/100.7, 112; 367/118,
124, 129, 126, 123; 342/147

[56] References Cited
U.S. PATENT DOCUMENTS 2,349,370  5/1944  Orner ................................. 367/129
2,854,764  10/1958  Pierce et al. ........................ 367/104
2,897,351  6/1959  Melton ................................. 367/59
2,932,002  4/1960  Keiser ................................. 367/129
2,948,970  8/1960  Carruthers et al. ................ 367/126
2,958,039  10/1960  Anderson ............................ 367/42

Primary Examiner—Nelson Moskowitz
Assistant Examiner—Daniel T. Pihulic
Attorney, Agent, or Firm—Kenneth E. Walden

[57] ABSTRACT

This invention relates to detecting and ranging on energy sources and more particularly to ascertaining the presence and range of sound emitting sources by passive apparatus.

12 Claims, 1 Drawing Sheet

DETECTING AND RANGING SYSTEM

The invention described herein may be manufactured and used by or for the Government of the United States of America for governmental purposes without the payment of any royalties thereon or therefor.

This invention relates to detecting and ranging on energy sources and more particularly to ascertaining the presence and range of sound emitting sources by passive apparatus.

In the past, underwater detection and ranging systems have been primarily of the active type, commonly referred to as sonar. In modern warfare sonar systems are not advantageous under all conditions of service because of the ease with which the enemy can detect the radiated ping and thereby easily ascertain the presence of the source.

Recently passive underwater detection and ranging systems have been developed such as disclosed in application Ser. No. 802,575 for a "Passive Underwater Target Detection and Locating System" invented by J. C. Munson and filed Mar. 27, 1959 to alleviate the objection to sonar apparatus. In using the passive equipment disclosed in the aforementioned application it was found that considerably more information concerning the target being detected was obtained when another boat crossed between the detectors and the target, or interfered with the received signal.

Accordingly, it is an object of this invention to provide a system and method for incorporating the interference effect into a detection and ranging system.

Another object of this invention is to provide a new and improved passive detection and ranging system.

A further object of this invention is to provide a passive detection system capable of ascertaining the presence and range of a sound emitting source at considerably greater distances than heretofore possible with passive equipment.

An additional object of this invention is to provide a detection system for quiet targets.

Various other objects and advantages will appear from the following description of one embodiment of the invention and the novel features will be particularly pointed out hereinafter in connection with the appended claims.

Briefly, the apparatus herein employed utilizes three hydrophones for detecting compressional waves emitted by a sound source. The hydrophones are connected to data processing and correlating apparatus. A pair of outputs are obtained from the correlators having phase relationships inversely proportional to the distance of the sound source to the detectors. A signal is generated simulating the interference effect of a sound source or pseudo target crossing the actual signal. The simulated signal is directly combined with one of the correlated signals to form what may be considered a standard signal. The simulated signal is also delayed in such a manner as to make it appear to be located at three fixed distances from the detecting apparatus. The simulated signals which make the pseudo target appear at three different points are combined with the other correlated signals. These three signals are fed into three oscilloscopes with the standard signal. The standard signal applied to a pair of the oscilloscopes is delayed so that its phase coincides with the other signal applied to the oscilloscope.

Referring now to the accompanying drawing in which like reference numerals designate like parts throughout the figures thereof and wherein.

Figure 1:
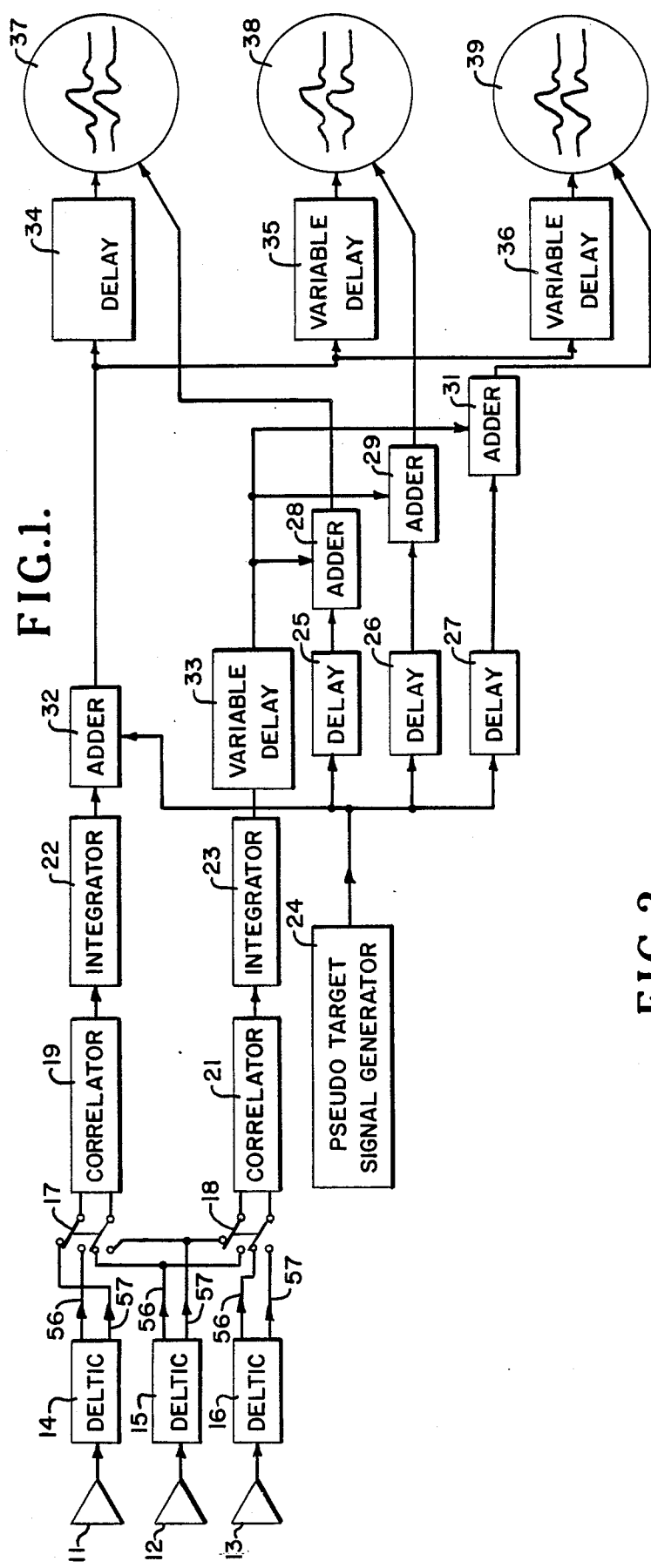
FIG. 1 is a block diagram of a preferred embodiment of the invention.

FIG. 1 of the drawing illustrates three hydrophones 11, 12 and 13 which are to be spaced preferably in a straight line on a ship in such a manner as to detect energy transmitted through the water. The signals detected by the hydrophones 11, 12 and 13 are respectively fed to data processing units 14, 15 and 16. Each of these units is commonly referred to as a DELTIC, which means Delay Line Time Compressor.

The contents and operation of the DELTIC units are completely explained and described in the aforementioned application of J. C. Munson. Each DELTIC unit samples the polarity of the information detected by the respective hydrophone once every 50 microseconds and generates a pair of digital wavetrains in response to these signals. Thus a positive compressional sound wave detected by hydrophone 11 causes a positive signal to be generated by DELTIC unit 14 and a decrease in the pressure or a negative compressional sound wave detected by hydrophone 11 causes a zero signal to be generated by DELTIC unit 14. Each of the DELTIC units time compresses the received signal so that pulses will be produced by each DELTIC unit every 0.1 microseconds. One output 57 of each DELTIC unit will be a train of pulses wherein the same 500 bits of information are repeated once every 50 microseconds for 25 milliseconds, i.e. the information is repeated 50 times. After 25 milliseconds 500 new bits of information appear at output 57. The other output 56 of each DELTIC unit will be a train of pulses wherein 500 bits of information appear every 50 microseconds. All but one of these bits will be related to a similar bit which appeared in the previous 50 microsecond interval. One new bit indicative of recently received information will appear in the 50 microsecond interval while one bit indicative of older information will be dropped in the 50 microsecond interval. In this manner the information appearing at output 56 moves along bit by bit with respect to the signal at output 57. Thus in any 25 millisecond interval each bit on lead 57 appears in time coincidence with all of the signal bits on lead 56.

The output 57 of DELTIC unit 14 is supplied to correlator 19 by way of an armature on ganged switch 17. The output 56 of DELTIC unit 15 is supplied to correlator 19 by way of the other armature on switch 17. The output 57 of DELTIC unit 15 is supplied to correlator 21 by way of one armature on ganged switch 18 while the output 56 of DELTIC unit 15 is supplied to correlator 21 by the other armature of switch 18. The ganged switches will be in the position shown when range information regarding a target situated closer to hydrophone 13 than hydrophone 11 is desired. If range information regarding a target located closer to hydrophone 11 than hydrophone 13 is desired, switches 17 and 18 will be in the opposite position to that shown. If detection information alone is desired, switch 18 will be moved to the opposite position than that shown and switch 17 will remain fixed.

Correlators 19 and 21 are designed to be of the polarity coincidence type. This element is completely disclosed and explained in the aforementioned application of J. C. Munson in addition to U.S. Pat. No. 2,897,351 issued Jul. 28, 1959 to B. S. Melton. Correlators 19 and 21 will produce a positive signal when like polarity signals are applied thereto and a negative signal when opposite polarity signals are applied thereto. Thus in the position of the switches as shown, if DELTICS 14 and 15 fed a pair of positive signals to correlator 19 a positive output will be obtained therefrom, likewise a pair of negative signals fed to the correlator produces a positive output. However, if positive and negative signals are simultaneously fed to one of the correlators a negative signal is produced thereby. In this manner correlator 19 compares the output 57 of DELTIC unit 14 with the output 56 of DELTIC unit 15 and correlator 21 compares the output 57 of DELTIC unit 15 with the output 56 of DELTIC unit 16 when the switches are in the position shown.

The outputs of correlators 19 and 21 are connected to integrators 22 and 23, respectively. The integrators are preferably of the dielectric recorder type as disclosed in the copending application of Victor C. Anderson, Ser. No. 585,827, filed May 18, 1956, now U.S. Pat. No. 2,958,039 under which the assignee of this application has a license. The integrators 22 and 23 produce signals of correlogram waveform having a 25 millisecond period of recurrence. The phase difference between the outputs of the integrators is indicative of the range of the source being detected from the listening station. Thus, the time separation between the maximum amplitude of the signals produced by integrators 22 and 23 is inversely proportional to the distance between the energy source and the detectors. The output of integrator 23 is supplied to variable delay element 33 which preferably is a movable head on the dielectric recorder integrating element.

In the system disclosed by the aforementioned application of Munson the integrator 22 and variable delay element 33 are both applied to a cathode ray oscilloscope so that both signals appear simultaneously on the face thereof. Delay element 33 is varied until the maximum amplitudes of both signals displayed by the oscilloscope coincide. The delay introduced by element 33 is inversely proportional to the range of the target being tracked. If the target being tracked is too far away from the receivers the outputs of integrators 22 and 23 will appear to coincide and no delay will be introduced by element 33. Accordingly, no information regarding the presence or range of a distant target will be obtained. All of the apparatus heretofore described and explained is completely disclosed in the aforementioned application of Munson.

The present invention is an improvement of the system in the previously filed application utilizing the interference effect of a sound source crossing the sound waves emitted by the target. If the interfering signal is at the proper distance from the detectors it will cause a time separation of the maximum amplitudes of the signals produced by integrators 22 and 23 in the prior system when ranging on a target other than the interfering signal.

Figure 2:
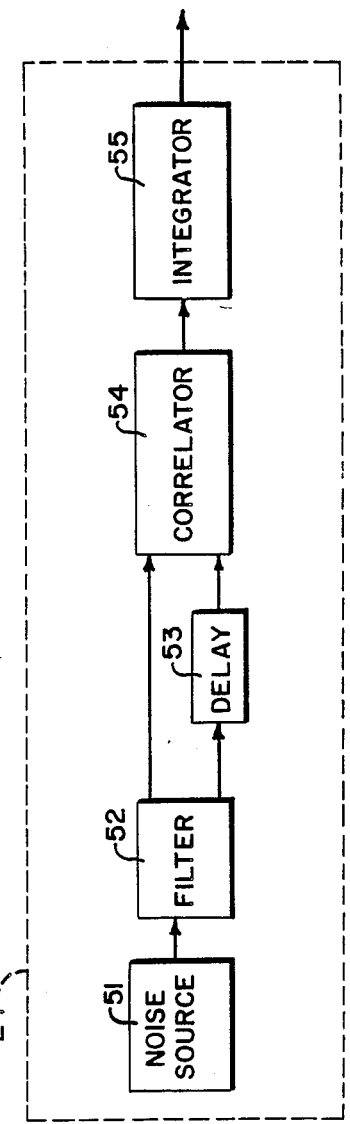
FIG. 2 is a block diagram of a preferred embodiment of the pseudo target signal generator.

The interference effect is simulated by a pseudo target signal generator which may either be a fixed frequency sinusoidal oscillator or a correlogram signal generator such as shown in FIG. 2 and hereafter explained. The frequency of sine wave generator 24 is selected to be at the middle of the frequency spectrum produced by a real ship, i.e. 2200 cycles. If a correlogram generator is used it is designed so that the upper and lower frequencies produced thereby are coincident with the frequency spectrum emitted by a real ship.

Generator 24 is connected to a conventional adding circuit 32 where it is combined with the output of integrator 22. The voltage produced by adder 32 may be considered as having a standard phase.

Generator 24 is also connected to fixed time delay elements 25, 26 and 27. The delay of each of these units is picked so that the pseudo target will appear to be located at three different points. This is accomplished because the delay elements phase shift the output of the generator in such a manner as to simulate the reception of the recurrent wave relationship which would be produced by an interferring source. Thus, each of the delay elements in combination with generator 24 may be considered as a separate pseudo target generator. The delay elements 25-27 may be a lump parameter delay line, a recorder having a plurality of spaced pick-up heads, three separate phase shifter networks or any other suitable apparatus.

The outputs of delay elements 25, 26 and 27 are combined with the signal produced by variable delay means 33 by the adding circuits 28, 29 and 31 respectively. The outputs of adding circuit 32 are respectively applied to delay element 34 and variable delay means 35 and 36. Delay element 34 is of similar construction to delay elements 25, 26 and 27 and is designed to introduce a time retardation into the output of adder 32 equal to the delay of element 25. The variable delay elements 35 and 36 may be a tapped delay line, a recorder having a movable pick-up head or any other appropriate apparatus.

The delay elements 34, 35 and 36 and adding circuits 28, 29 and 31 are respectively connected to display means 37, 38 and 39 which preferably are cathode ray oscilloscopes. Each of the oscilloscopes includes means to simultaneously display a pair of signals. This may be effected by a dual beam oscilloscope or the two input signals can be fed to an electronic switching circuit which multiplexs them to a single beam oscilloscope. The preferred embodiment utilizes the switching arrangement because the phase relationship of the two displayed correlograms must be identical. For purposes of explanation it will be assumed that the upper traces on each oscilloscope are obtained from the delay devices 34, 35 and 36 and the lower traces are produced by the output of the adders 28, 29 and 31.

The delay introduced by element 25 is picked so that maximum time separation between the peaks of the upper and lower correlograms displayed on oscilloscope 37 will be achieved. If the two correlograms displayed on oscilloscope 37 are in phase, i.e. no time separation between the peaks of the upper and lower traces, it is known that no signal is being detected by hydrophones 11, 12 and 13 since no signal will be obtained from integrators 22 or 23 and delays 34 and 25 are equal. However, if a quiet target such as an atomic submarine is within 30,000 yards of the detectors some time separation between the displayed waveforms will occur. Thus the time relationship between the outputs of adder 28 and delay 34 is indicative of the presence of a target as is the time relationship between the output of adders 28 and 32.

The delay introduced by element 26 is selected so that the peak amplitude of the lower trace displayed on oscilloscope 38 occurs after the peak amplitude of the upper trace if variable delay element 35 introduces a delay equal to that of element 26. In this manner delay 26 simulates a pseudo source located fairly close to the real source and located on one side thereof. The delay introduced by element 27 is designed so the peak amplitude of the upper trace displayed on oscilloscope 39 occurs after the peak amplitude of the lower trace if variable delay element introduces a delay equal to that of element 27. In this manner delay 27 simulates a pseudo source located fairly close to the real source and located on the opposite side of that simulated by the output of delay 26. Thus, the peak amplitudes of the lower displays on the faces of scopes 38 and 39 should be on opposite sides of the peak amplitudes of the upper traces. If the peak of the lower correlogram appearing on oscilloscope 39 is on the same side as the corresponding peak on oscilloscope 38 with respect to the upper traces, delay 33 must be varied until the correlograms appear in the proper place. Varying element 33 in this manner simulates movement of the actual target signal with respect to the pseudo source. When the peak amplitudes of the lower traces of oscilloscopes 38 and 39 are on opposite sides of the upper traces, the real target lies between the pseudo targets generated by delays 26 and 27.

When this occurs range information can be obtained. Delay elements 35 and 36 are varied until the upper and lower traces of oscilloscopes 38 and 39 coincide. The delay introduced by element 35 indicates the difference between the range of the real target after it has been shifted by delay 33 and the range of the pseudo target generated by delay 26 from the hydrophones. Likewise, the delay introduced by element 36 indicates the difference between the range of the real target after it has been shifted by delay 33 and the range of the pseudo target generated by delay 27 from the hydrophones.

Variable delay elements 33, 35 and 36 can be calibrated in distance so that an operator can determine the range which each is indicative of or the amount of delay can be fed to a computer so the range of the real target can be ascertained. The delay of elements 26 and 27 must be picked so that the relationship between the lower traces on oscilloscopes 38 and 39 are linearly related to the time delays of the pseudo target signals introduced by elements 26 and 27. Thus, if it is assumed that the pseudo target signal generated by element 26 is delayed 250 microseconds, and variable delay 35 must introduce a 228 microseconds delay in order to make the two traces on oscilloscope 38 coincide, the difference between the two sources is commensurate with 22 microseconds. Also, if it is assumed that the delay introduced by element 27 is 100 microseconds, and variable delay 36 must introduce a 120 microsecond delay in order to make the two traces on oscilloscope 39 coincide, the difference between these two sources is 20 microseconds. Since it can be proved theoretically that a linear relationship exists when the two pseudo targets generated by delays 26 and 27 are close to and on opposite sides of the real target, the range of the actual source can be ascertained by determining the equation of the line and calculating the point where the pseudo source and the real source would coincide. In the example illustrated above one point on the line would have an abscissa of 250 and an ordinate of −22 and another point on the line would have an abscissa of 100 and an ordinate of +20. The time delay in the reception of the real target signal between the hydrophones is determined by ascertaining the abscissa of the curve where the ordinate is zero, which in the illustrated example is 165 microseconds. This time is inversely related to the range of the real target. If it was necessary to introduce a delay into element 33 to make the lower traces on oscilloscopes 38 and 39 appear on opposite sides of the upper trace, this factor must enter into the computation of range. These calculations can be performed either by hand or with a simple computer.

Bearing information can be obtained from either oscilloscope 38 or 39 in the same manner that it is determined by the apparatus disclosed in the aforementioned application of Munson. Broadly, bearing is ascertained by measuring the position where the peak amplitude of the upper correlogram occurs with respect to the position of the start of each sweep applied to the scope.

Referring now to FIG. 2, a block diagram of a preferred embodiment of pseudo target generator 24 is shown. An electronic source 51 which will produce noise over the entire frequency spectrum is connected to a band pass filter 52. Filter 52 is designed to pass only the noise signals in the frequency spectrum which a ship would normally produce. One output of filter 52 is fed directly to correlator 54 while the other output of the filter is supplied to the correlator by way of delay 53. The correlator 54 may be either of the polarity coincidence or the multiplier type. The output of the correlator is connected to a suitable integrating circuit. The signal obtained from the integrator 55 is in the shape of a correlogram and is the cross correlation function of the output of filter 52.

The interference effect can be produced in other ways than that disclosed in FIG. 1. For instance, a noise source simulating three different pseudo targets can be combined directly with the signals detected by hydrophones 11, 12 and 13. In order to accomplish this, the noise signal must be supplied to seven different delay elements, six of which are variable. The outputs of all of the delay elements are combined with the signals detected by the hydrophones resulting in nine different signals. Three signals are produced for each of the three pseudo targets. Each trio of signals is then supplied to the apparatus disclosed in the aforementioned application of Munson. This necessitates the use of three of the systems disclosed in the application of Munson. While such apparatus is possible to construct and use, the feasibility of its use is not great because of the great amount of equipment necessary.

The invention herein disclosed is capable of many modifications and variations. For instance, integrators 22 and 23 may be a digital computer if the response of other types is not sufficiently fast. Also correlators 19 and 21 may be either of the polarity coincidence or multiplier type. In addition, the particular values of the time relationships and parameters set forth are for purposes of explanation only and are in no way intended to limit the claims. It will be understood that various other changes in the details, materials, steps and arrangements of parts, which have been herein described and illustrated in order to explain the nature of the invention, may be made by those skilled in the art within the principles and scope of the invention as expressed in the appended claims.

What is claimed is:

1. Apparatus for determining the existence of a sound source from a listening station, comprising three sound detectors, first means for combining the output of the first and second detectors to produce a first signal, second means for combining the output of the second and third detectors to produce a second signal, a simulated signal source, means coupled to said signal source and to said first means for adding the outputs thereof, means for effecting a fixed time delay between the signal source and the second signal and coupled thereto, a signal addition means for combining the output of said delay means with the second signal, a variable delay element coupled to said addition means, a display element, and means for coupling the output of said variable delay element and the output of said addition means to said display element.

2. Apparatus for ascertaining the presence of a radiating source comprising means for detecting energy produced by the source, first means coupled to said detecting means for producing a pair of signals having a time relationship indicative of the range from the detecting means to the source, means for generating a signal simulating a source of energy, means coupled to said first means and to said generating means for combining the simulated source of energy signal with one of the signals produced by said first means to produce a first output signal, means coupled to said generator for simulating the range of the simulated source of energy from said detecting means, and means coupled to said last named means and to said first means for combining the other signal produced by said first means with the signal produced by said last named means to produce a second output signal, whereby the time relationship between the first and second output signals indicates the presence of the radiating energy.

3. Apparatus for determining the existence and range of a sound source from a listening station, comprising three sound detectors, first means for combining the output of the first and second detectors to produce a first signal, second means for combining the output of the second and third detectors to produce a second signal, a simulated signal source, means coupled to said signal source and to said first means for adding the outputs thereof, a plurality of means for effecting a plurality of different fixed time delays between the signal source and the second signal and respectively coupled thereto, a plurality of signal addition means for respectively combining the output of each of said delay elements with the second signal, a plurality of variable delay elements each coupled to said adding means, a plurality of display elements, and means for coupling the output of each of said variable delay elements and the output of each of said addition means respectively to a respective one of said plurality of display elements.

4. Apparatus for determining the existence of a source of radiating energy comprising a plurality of means for detecting the energy, first means coupled to said detecting means for producing a pair of signals having relative phase relationships indicative of the range from the energy source to the detectors, a pseudo signal source, second means coupled to said pseudo signal source and to said first means for combining one of the signals of said pair with the pseudo energy signal to produce a first output signal, and third means coupled to said pseudo signal source and to said first means for combining the second signal of said pair with a signal from the pseudo source at a predetermined range from said detecting means to produce a second output signal, whereby the phase relationship between the first and second output signals indicates the presence of the radiating energy.

5. The apparatus of claim 4 wherein said first means includes means for simulating a displacement between the energy source and the pseudo signal source.

6. The apparatus of claim 4 further comprising a variable delay element coupled to said second means, and a means coupled to said variable delay element and to said third means for displaying the signals produced thereby.

7. Apparatus for determining the existence and location of a radiant energy source comprising a plurality of means for detecting the energy, first means coupled to said detecting means for producing a pair of signals having relative phase relationships indicative of the range from the energy source to the detectors, a pseudo signal source, second means coupled to said pseudo signal source and to said first means for combining one of the signals of said pair with the pseudo energy signal to produce a first output signal, and third means coupled to said pseudo signal source and to said first means for combining the second signal of said pair with a plurality of signals from the pseudo source, said plurality of signals simulating a plurality of sources located at a plurality of predetermined ranges from said detecting means to produce a plurality of output signals, where by the phase relationship between the first output signal and the plurality of output signals from the pseudo source is indicative of the range between the detecting means and the radiant energy source.

8. The apparatus of claim 7 further comprising a plurality of variable delay elements each coupled to said second means, and a plurality of means each respectively coupled to said plurality of variable delay elements and to said third means for displaying the signals produced by said delay elements.

9. The apparatus of claim 7 wherein said first means includes means for simulating a displacemnt between the energy source and the pseudo signal source.

10. Apparatus for determining the existence and range of a sound source from a listening station comprising three hydrophones, first means for correlating the output of one of said hydrophones with the output of the second of said hydrophones, second means for correlating the output of the third of said hydrophones with the output of the second of said hydrophones, means coupled to both of said correlating means for separately integrating the outputs thereof to produce first and second signals, said integrating means including a variable delay element to delay the second signal with respect to the first signal, a pseudo target generator, three time delay elements having different fixed delays and each connected to said generator, first adding means connected to said integrating means and to the first fixed delay element for combining the second signal with the output of the first fixed delay element, second adding means connected to said integrating means and to the second fixed delay element for combining the second signal with the output of the second fixed delay element, third adding means connected to said integrating means and to the third fixed delay element for combining the second signal with the output of the third fixed delay element, fourth adding means connected to said integrating means and to said generator for combining the first signal with the output of said generator to produce a third signal, three variable delay elements each connected to said fourth adding means, three oscilloscopes, each having means to display two traces, means coupling the output of each of said variable delay means to a respective one of said oscilloscopes, and means coupling the output of said first, second and third adding means to a respective one of said oscilloscopes.

11. The apparatus of claim 10 wherein said generator includes a noise source, a filter connected to said noise source, and means connected to said filter for autocorrelating the output thereof.

12. Apparatus for determining the existence of a sound source from a listening station comprising three hydrophones, first means for correlating the output of one of said hydrophones with the output of the second of said hydrophones, second means for correlating the output of the third of said hydrophones with the output of the second of said hydrophones means coupled to both of said correlating means for separately integrating the outputs thereof to produce first and second signals, said integrating means including a variable delay element to delay the second signal with respect to the first signal, a pseudo target generator, a fixed time delay element connected to said generator, first adding means connected to said integrating means and to said fixed delay element for combining the second signal with the output of said fixed delay element, second adding means connected to said integrating means and to said generator for combining the first signal with the output of said generator, a variable delay element connected to said second adding means, and an oscilloscope connected to said variable delay element and to said first adding means, said oscilloscope including means to simultaneously display both of the signals coupled thereto.

* * * * *